J. B. BATT.
CLOSURE FOR PIPES.
APPLICATION FILED APR. 8, 1914.
1,148,567.
Patented Aug. 3, 1915.
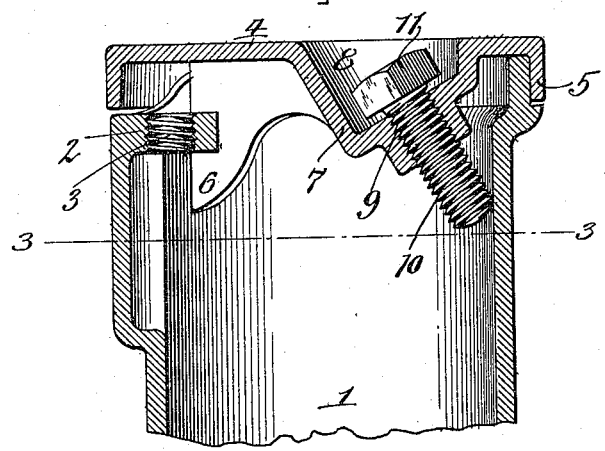
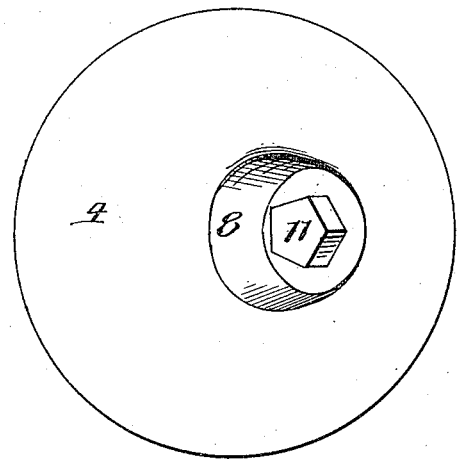
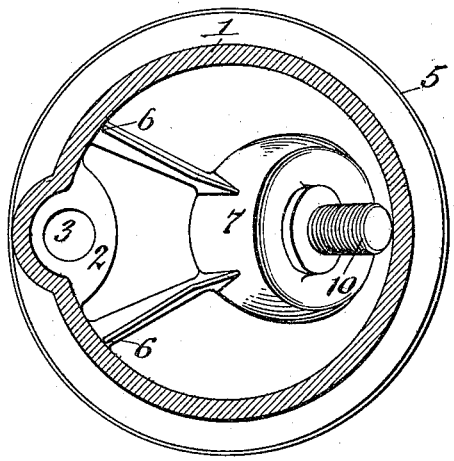
WITNESSES
INVENTOR
John B. Batt
by Geyer & Popp
ATTORNEYS

UNITED STATES PATENT OFFICE.

JOHN B. BATT, OF NORTH TONAWANDA, NEW YORK, ASSIGNOR TO THE CENTRAL FOUNDRY COMPANY, OF NEW YORK, N. Y., A CORPORATION OF MAINE.

CLOSURE FOR PIPES.

1,148,567.  Specification of Letters Patent.  Patented Aug. 3, 1915.

Application filed April 8, 1914. Serial No. 830,393.

*To all whom it may concern:*

Be it known that I, JOHN B. BATT, a citizen of the United States, residing at North Tonawanda, in the county of Niagara and State of New York, have invented new and useful Improvements in Closures for Pipes, of which the following is a specification.

This invention relates to a cap or closure for the ends of pipes and more particularly to that class of pipes which are known as service boxes or stop cock boxes through which access may be had to the cocks or valves of gas, water and other pipes by means of a key for turning said valves on and off.

In the type of stop cock box most commonly in use heretofore, the cap or cover was secured to the box or pipe by means of a screw passing vertically through the cover and engaging with a screw threaded lug on one side of the axis of the pipe and cover which frequently results in this lug being broken off and the cover becoming detached and lost by reason of the heaving or lifting action of frost on the ground.

It is the object of my invention to provide a cover or cap for stop cock boxes or similar pipes which can be produced at very small cost, which will securely fasten the cover to the pipe and which if lifted on the pipe will not break any parts of the pipe, cover or the fastening.

In the accompanying drawings, Figure 1 is a vertical section of a stop cock box or pipe provided with my improved cap or closure. Fig. 2 is a top plan view thereof. Fig. 3 is a horizontal section taken in the correspondingly numbered line in Fig. 1.

Similar characters of reference indicate corresponding parts throughout the several views.

1 represents a stop cock or service box or pipe of the usual and well known construction through which a wrench may be passed for reaching the valve or stop cock of a service conduit which is buried under ground. The upper end of this service box may be provided in its bore on one side of its axis with the usual fastening lug 2 having an internally threaded opening 3 which is adapted to receive the screw of a cover in the ordinary manner. When, however, my improved cover is applied to this service box or pipe the fastening lug 2 is not required and may be omitted from the pipe.

My improved cover or cap for closing the upper end of the pipe preferably comprises a horizontal disk or body 4 which engages with the upper end of the pipe and is provided with an inwardly or downwardly projecting marginal flange 5 surrounding the adjacent peripheral part of the pipe. On its inner or underside this cover is provided on one side of its axis with a fixed abutment adapted to engage with the bore of the pipe on one side of its axis, which abutment preferably consists of two downwardly or inwardly projecting lugs 6 arranged on the underside of the cover and engaging with two different parts of the bore of the pipe on one side of its axis. When the cover is applied to a service box having the lug 2 either in its complete or broken form the cover is so applied to this pipe that its abutment lugs 6 engage with the bore of the pipe on opposite sides of the fastening lug, as shown in Fig. 3. On the opposite side of the axis of the cover its body or disk is provided with an inwardly or downwardly depressed portion 7 forming an outwardly opening pocket 8 the bottom of which is provided with an inclined opening 9 having an internal screw thread. Working in this screw threaded opening is the inclined screw threaded shank 10 of a clamping bolt which engages its inner end with the bore of the service pipe on the opposite side of its axis, said screw being pressed against this part of the pipe by applying a wrench to the outer end of the clamping screw. For this purpose the outer end of the latter is suitably constructed to receive a wrench, the preferred form consisting of a flat sided head 11 similar to an ordinary bolt which is adapted to receive a socket wrench of the usual kind employed for tightening or loosening the screws of service box covers. Upon tightening the clamping screw against one side of the pipe the abutment lugs engage with the opposite side of the same so that the cover is frictionally held upon the pipe by means which grip the pipe on substantially diametrically opposite sides. This frictional hold is sufficient to retain the cap or cover on the pipe under ordinary conditions. If, however, the lifting effect of the frost in the ground should tend to raise the cover the abutment lugs and clamping screw will merely slip upward uniformly within the bore of the pipe, thereby preventing the cover from being tipped or raised unevenly, whereby breaking of any parts of the pipe, screw or cover is avoided and it is possible to again restore the cover to its normal position.

By forming a pocket in the top of the cover for the reception of the head of the clamping bolt this head is normally below the upper surface of the cover where it is out of the way and not liable to be broken off or interfered with by the passing of anything over the same.

Inasmuch as this cover consists of but two parts and but little fitting is required to put it into shape for use, the same can be manufactured at very low cost.

I claim as my invention:

1. A closure for the pipe of a stop cock box comprising a cap adapted to fit over the upper end of said pipe and provided on one part thereof with a depending lug adapted to engage with one part of the usual vertical bore of said pipe, and an inclined clamping screw arranged in a threaded opening in another part of said cap and also adapted to engage with the usual vertical bore of said pipe for frictionally retaining said cap on said pipe.

2. A closure for the pipe of a stop cock box comprising a cap adapted to engage the end of said pipe and having an annular flange adapted to surround the pipe, a depending lug adapted to engage one part of the usual vertical bore of the pipe and a pocket in its top which is provided in its bottom with a screw threaded opening the axis of which is arranged at an angle to the axis of the cap, and an inclined clamping screw working in said threaded opening and having its head arranged in said pocket and adapted to engage its lower end with another part of the usual vertical bore of said pipe for retaining said cap frictionally on said pipe.

Witness my hand this 7th day of April, 1914.

JOHN B. BATT.

Witnesses:
Theo. L. Popp,
E. M. Graham.

Copies of this patent may be obtained for five cents each, by addressing the "Commissioner of Patents, Washington, D. C."